US011663547B2

(12) United States Patent
Krishnamoorthy et al.

(10) Patent No.: US 11,663,547 B2
(45) Date of Patent: May 30, 2023

(54) EVOLUTIONARY SOFTWARE PRIORITIZATION PROTOCOL FOR DIGITAL SYSTEMS

(71) Applicant: BANK OF AMERICA CORPORATION, Charlotte, NC (US)

(72) Inventors: Madhusudhanan Krishnamoorthy, Tamilnadu (IN); Preethi Dhayalan, Tamilnadu (IN); S. Ushma Kaleshwari, Tamilnadu (IN); Rani Kuncham, Telangana (IN); Charulatha Krishnakumar, Tamilnadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 469 days.

(21) Appl. No.: 17/072,396

(22) Filed: Oct. 16, 2020

(65) Prior Publication Data
US 2022/0122016 A1    Apr. 21, 2022

(51) Int. Cl.
*G06F 9/44* (2018.01)
*G06Q 10/0639* (2023.01)
*G06Q 10/10* (2023.01)
*G06Q 30/018* (2023.01)
*G06N 10/00* (2022.01)
(Continued)

(52) U.S. Cl.
CPC ....... *G06Q 10/06395* (2013.01); *G06N 10/00* (2019.01); *G06Q 10/0637* (2013.01);
(Continued)

(58) Field of Classification Search
CPC ............. G06N 10/00; G06Q 10/06313; G06Q 10/0637; G06Q 10/06395; G06Q 10/101; G06Q 10/103; G06Q 30/018
(Continued)

(56) References Cited

U.S. PATENT DOCUMENTS 8,572,550 B2 * 10/2013 Fox ............................ G06F 8/70
717/100
9,311,613 B2 * 4/2016 Cope ........................ G06F 8/75
(Continued)

OTHER PUBLICATIONS

Lanubile et al., "Evaluating predictive quality models derived from software measures: Lessons learned", 1997, Elsevier, pp. 225-234. (Year: 1997).*
(Continued)

*Primary Examiner* — Ted T. Vo
(74) *Attorney, Agent, or Firm* — Moore & Van Allen PLLC; James C. Edwards

(57) ABSTRACT

Evolutionary learning techniques are used to validate and prioritize open source software libraries for subsequently determining the best open source software library for a specified technical project. Data associated with the open source software candidates is collected into a cluster and, at an eligibility layer, a fitness score is determined for each of the open source software candidate. Candidates that are determined to meet a required fitness score threshold are passed to the crossover layer, at which, software and hardware standards rules are applied to the open source software metadata to validate the open source software. Invalid candidates are held in queue and subjected to rework analysis. A mutation layer executes the crossover layer iteratively until a predetermined volume of open source candidates results. A ranking layer provides a prioritized ranking list, based on the fitness score, of those open source software candidates that have validated. The list is displayed with a dashboard application to applicable software developers.

20 Claims, 4 Drawing Sheets

(51) Int. Cl.
  *G06Q 10/0637*  (2023.01)
  *G06Q 10/101*   (2023.01)
  *G06Q 10/0631*  (2023.01)
(52) U.S. Cl.
  CPC ..... *G06Q 10/06313* (2013.01); *G06Q 10/101* (2013.01); *G06Q 10/103* (2013.01); *G06Q 30/018* (2013.01)
(58) Field of Classification Search
  USPC .................................................. 717/101–103
  See application file for complete search history.

(56) References Cited

U.S. PATENT DOCUMENTS

| | | | |
|---|---|---|---|
| 9,436,463 B2* | 9/2016 | Sass | G06F 8/75 |
| 9,594,886 B2* | 3/2017 | Ricci | G06F 21/105 |
| 10,241,759 B2* | 3/2019 | Sass | G06F 8/36 |
| 10,839,157 B2* | 11/2020 | Chen | G06F 40/30 |
| 2007/0299835 A1 | 12/2007 | Takeuchi | |
| 2012/0240096 A1* | 9/2012 | Sass | G06F 8/75 717/101 |
| 2018/0060734 A1* | 3/2018 | Beller | G06N 20/00 |

OTHER PUBLICATIONS

Frantz et al., Ranking Open Source Application Integration Frameworks Based on Maintainability Metrics: A Review of Five-year Evolution, 2019, Wiley, pp. 1531-1549. (Year: 2019).*
Adewumi et al., "FOSSES: Framework for open-source software evaluation and selection", 2019, Wiley, pp. 780-812. (Year: 2019).*

* cited by examiner

EVOLUTIONARY SOFTWARE PRIORITIZATION PROTOCOL FOR DIGITAL SYSTEMS

FIELD OF THE INVENTION

The present invention relates to open source software decisioning and, more specifically, using an evolutionary software platform to validate and prioritize the use of open source software for technical projects within an enterprise.

BACKGROUND

The use of open source software is becoming more prevalent throughout the computing environment. In many instances, an enterprise will desire to use open source software as a means of solving the technical problem they are confronted with. Usage of open source software throughout industries which have heretofore been averse to such becomes more evident with continual acceptance of open source software across the computing spectrum and the need for code collaboration between internal and external entities.

However, by its very nature open source software is prone to security vulnerabilities and defects (i.e., bugs or the like). In the event open source software is implemented without a robust validation that ensures that the code is devoid of security threats and/or defects, invariably such usage will result in network-level issues, application/platform issues and/or undesirable proprietary data leakage.

Moreover, as open source software becomes a more prevalent and reliable, the number of open source options that can seemingly address a specific technical problem increases. As such, choosing the best open source option from both a vulnerability and a technical requirement perspective can be a challenging endeavor that is fraught with uncertainty and may result in implementing open source software that is not the most suited for the task at hand.

Therefore, a need exists to provide for validating and prioritizing open source software for addressing specific technical needs. The validation and prioritization process should take into account the vulnerabilities posed the open source software, including the possibility of proprietary data leakage and any known defects in the code. In addition, the desired process should ensure that the open source software meets both project-level requirements, as well as, enterprise-level requirements. Moreover, the desired validation and/or prioritization should ensure that the project facing the technical challenge is provided with an adequate number of possible open source candidates that meet both functional and non-functional expectations.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by utilizing evolutionary learning techniques to identify and prioritize suitable open source software candidates that meet both project level and enterprise level requirements and have the requisite functional fitness in terms of vulnerabilities, defects, hardware and software dependencies, usage familiarity and performance and the like.

Specifically, genetic-type algorithms executed within an evolutionary computing platform are implemented to intelligently analyze a corpus of open source candidates and generate a ranked/prioritized listing of suitable open source software candidates that is subsequently presented to a user via a dashboard-type application.

The algorithms are configured to receive and/or collect a population of data, referred to herein as a cluster, for each of the open source software candidates. This data may include, but is not limited to, the metadata associated with the open source code; security vulnerability data including defects, data leakage issues and the like; project and enterprise requirements data, usage and performance data, dependency data, hardware and software standards rules and the like.

Once the clusters are formed, the eligibility layer determines a fitness score for each of the open source software candidates based on the data in the respective cluster. In specific embodiments of the invention, the eligibility layer bifurcates the data in the cluster into functional data and non-functional data and determines a separate fitness score for both the functional data and the non-functional data. The fitness scores are compared to a threshold to identify which open source software candidates are eligible for the crossover layer. In addition, the eligibility layer defines a convergence goal as the number of open source software candidates that meet or exceed the fitness threshold.

The crossover layer applies software and hardware standards rules to the metadata of the eligible open source software candidates to determine which candidates are validated. In specific embodiments of the invention, the crossover layer applies the software and hardware standards rules to the functional and non-functional metadata of the eligible open source software candidates to determine functional validation and non-functional validation. Eligible open source software candidates determined to be invalid are placed in rework queue where issues related to their invalidation may be addressed. A mutation layer iteratively executes the crossover layer until a predetermined number of eligible candidates are determined to meet validation requirements. A prioritization/ranking layer determines a ranked listing of the eligible and validated open source software candidates, in which the ranking is based on the fitness score. In specific embodiments, the prioritization/ranking layer determines both functional ranked listing and a non-functional ranked listed and aggregates/consolidated the two ranked listed into one overall prioritization/ranked list of eligible and validated open source software candidates. Subsequently, the ranked listing(s) are displayed within a dashboard-type application, so that developers can choose the best open source software for the specified technical project.

A system for validating and prioritizing open-source software, defines first embodiments of the invention. The system includes a computing platform having a memory, and one or more processing devices stored in the memory. The system additionally includes an evolutionary computing platform that is stored in the memory and executable by the one or more processing devices. The platform includes one or more genetic-type algorithms. The algorithm(s) include a data population layer configured to gather (i.e., collect or receive) information related to a plurality of open source software candidates to be considered for use in a technical project. In addition, the algorithm(s) includes an eligibility layer configured to (i) logically determine a fitness score for each of the plurality of open sources software candidates based on the information, and (ii) compare the fitness score to a predetermined fitness threshold to determine one or more open source software candidates that meet or exceed the predetermined fitness threshold. Additionally, the algorithm(s) include a crossover layer configured to (i) receive the one or more open source software candidates determined to meet or exceed the predetermined fitness threshold, (ii) apply software standards rules and hardware standards rules to the one or more open source software candidates to determine which of the one or more open source software candidates meet or exceed validation requirements. In addition, the algorithm(s) include a mutation layer configured to iteratively execute the crossover layer until a predetermined number of the one or more open source software candidates meet or exceed the validation requirements. Further, the algorithm(s) include a prioritization layer configured to (i) receive the predetermined number of the one or more open source software candidates, and (ii) determine a prioritization list of the predetermined number of the one or more open source candidates, The prioritized list ranks the predetermined number of the one or more open source candidates based on the fitness score. Additionally, the system includes a dashboard application that is stored in the memory, executable by the one or more processing devices and configured to present, on a computing device display, the prioritized list.

In specific embodiments of the system, the data population layer is further configured to gather information related to the open source software candidates that includes one or more of (i) metadata associated with an open source software candidate, (ii) requirement data associated with open source software, (iii) performance data associated with one or more of the open source software candidates, (iv) data leakage and vulnerability data associated with the open source software candidates, and (v) dependency data associated with hardware and software dependencies of the open source software candidates.

In further specific embodiments of the system, the eligibility layer is further configured to bifurcate the information related to the plurality of open source software candidates into (a) a functional information, and (b) a non-functional information. In such embodiments of the system, the eligibility layer is further configured to (i) logically determine a functional fitness score based on the functional information and a non-functional fitness score based on the non-functional fitness score, and (ii) compare the functional fitness score to a predetermined functional fitness threshold and the non-functional fitness score to a predetermined non-functional fitness threshold to determine one or more open source software candidates that meet or exceed both the predetermined functional fitness threshold and the predetermined non-functional fitness threshold. In further related embodiments of the system, the functional information includes one or more of (i) requirements data associated with open source software, and (ii) familiarity and usage data associated with the one or more of the open source software candidates and the non-functional information includes one or more of (i) security vulnerability data including data leakage data associated with one or more of the open source software candidates, (ii) existing defect data associated with the one or more open source software candidates, and (iii) dependency data associated with hardware and software dependencies of the open source software candidates.

In still other related embodiments of the system, the crossover layer is further configured to (i) receive the one or more open source software candidates determined to meet or exceed both the predetermined functional fitness threshold and the predetermined non-functional fitness threshold, (ii) apply the software standards rules and the hardware standards rules to the functional information and the non-functional information of the one or more open source software candidates to determine which of the one or more open source software candidates meet or exceed both predetermined functional validation requirements and predetermined non-functional validation requirements. Moreover, in other related embodiments of the system, the prioritization layer is further configured to (i) receive the predetermined number of the one or more open source software candidates, and (ii) determine a functional prioritization list and a non-functional prioritization list for the predetermined number of the one or more open source candidates, wherein the functional prioritized list ranks the predetermined number of the one or more open source candidates based on the functional fitness scores and the non-functional prioritized list ranks the predetermined number of the one or more open source candidates based on the non-functional functional fitness scores. In other embodiments of the system, the prioritization layer is further configured to determine a consolidated prioritized list based on both the functional prioritized list and the non-functional prioritized list and the dashboard application is configured to present on a computing device display at least one of the consolidated prioritized list, the functional prioritized list and the non-functional prioritized list.

In other embodiments of the system, the eligibility layer is configured to (i) logically determine a weighted fitness score for each of the plurality of open sources software candidates based on the information. The weighted fitness score is based on positive numerical values for one or more technical project level expectations being met and negative numerical values for one or more of the technical project level expectations not being met. In such embodiments of the system, the eligibility layer is configured to define a convergence goal the number of open source software candidates that meet or exceed the fitness threshold. The convergence goal is used to determine the predetermined number of the one or more open source software candidates meet or exceed the validation requirements. In other related embodiments of the system, the crossover layer is further configured to update the convergence goal based on the one or more open source software candidates that meet or exceed the validation requirements.

A computer-implemented method for validating and prioritizing open source software defines second embodiments of the invention. The method is executed by one or more computing processor devices. The method includes executing one or more genetic algorithms to perform the steps of (a) gathering information related to a plurality of open source software candidates to be considered for use in a technical project, (b) determining, logically, a fitness score for each of the plurality of open sources software candidates based on the information, and (c) comparing the fitness score to a predetermined fitness threshold to determine one or more open source software candidates that meet or exceed the predetermined fitness threshold. The steps further include (d) apply software standards rules and hardware standards rules to the one or more open source software candidates to determine which of the one or more open source software candidates meet or exceed validation requirements, and (e) executing, iteratively, step (d) until a predetermined number of the one or more open source software candidates to meet or exceed the validation requirements. Further, the method includes determining a prioritization list of the predetermined number of the one or more open source candidates. The prioritized list ranks the predetermined number of the one or more open source candidates based on the fitness score, Moreover, the method includes providing on a computing device display a dashboard application that presents the prioritized list to a user.

In specific embodiments the method further includes bifurcating the information related to the plurality of open source software candidates into (a) a functional information, and (b) a non-functional information. In such embodiments of the method, determining the fitness score further includes determining a functional fitness score based on the functional information and a non-functional fitness score based on the non-functional fitness score, and comparing the fitness score further includes comparing the functional fitness score to a predetermined functional fitness threshold and the non-functional fitness score to a predetermined non-functional fitness threshold to determine one or more open source software candidates that meet or exceed both the predetermined functional fitness threshold and the predetermined non-functional fitness threshold. In related embodiments of the method, applying the software standards rules and the hardware standards rules further includes applying the software standards rules and the hardware standards rules to the functional information and the non-functional information of the one or more open source software candidates to determine which of the one or more open source software candidates meet or exceed both predetermined functional validation requirements and predetermined non-functional validation requirements.

In other related embodiments of the method determining the prioritization list further comprises determining a functional prioritization list and a non-functional prioritization list for the predetermined number of the one or more open source candidates, wherein the functional prioritized list ranks the predetermined number of the one or more open source candidates based on the functional fitness scores and the non-functional prioritized list ranks the predetermined number of the one or more open source candidates based on the non-functional functional fitness scores. In such embodiments the method may further include determining a consolidated prioritized list based on both the functional prioritized list and the non-functional prioritized list.

A computer program product including non-transitory computer-readable medium defines third embodiments of the invention. The computer-readable medium includes a first set of genetic algorithm codes for causing a computer to collect information related to a plurality of open source software candidates to be considered for use in a technical project and a second set of genetic algorithm codes for causing a computer to logically determine a fitness score for each of the plurality of open sources software candidates based on the information. Additionally, the computer-readable medium includes a third set of genetic algorithm codes for causing a computer to compare the fitness score to a predetermined fitness threshold to determine one or more open source software candidates that meet or exceed the predetermined fitness threshold. In addition, the computer-readable medium includes a fourth set of genetic algorithm codes for causing a computer to apply software standards rules and hardware standards rules to the one or more open source software candidates to determine which of the one or more open source software candidates meet or exceed validation requirements. Moreover, the computer-readable medium includes a fifth set of genetic algorithm codes for causing a computer to execute, iteratively, the fourth set of genetic algorithm codes until a predetermined number of the one or more open source software candidates meet or exceed the validation requirements. Further the computer-readable medium includes a sixth set of genetic algorithm codes for causing a computer to determine a prioritization list of the predetermined number of the one or more open source candidates. The prioritized list ranks the predetermined number of the one or more open source candidates based on the fitness score. Lastly, the computer-readable medium includes a seventh set of codes for causing a computer to provide on a computing device display a dashboard application that presents the prioritized list to a user.

In specific embodiments of the computer program product, the computer-readable medium additionally includes an eighth set of codes for causing a computer to bifurcate the information related to the plurality of open source software candidates into (a) a functional information, and (b) a non-functional information. In such embodiments of the computer program product, the second set of codes is further configured to cause the computer to determine a functional fitness score based on the functional information and a non-functional fitness score based on the non-functional fitness score, and the third set of codes is further configured to cause the computer to compare the functional fitness score to a predetermined functional fitness threshold and the non-functional fitness score to a predetermined non-functional fitness threshold to determine one or more open source software candidates that meet or exceed both the predetermined functional fitness threshold and the predetermined non-functional fitness threshold. In other related embodiments of the computer program product, the fourth set of codes is further configured to cause the computer to apply the software standards rules and the hardware standards rules to the functional information and the non-functional information of the one or more open source software candidates to determine which of the one or more open source software candidates meet or exceed both predetermined functional validation requirements and predetermined non-functional validation requirements.

In other related embodiments of the computer program product the sixth set of codes is further configured to cause the computer to determine a functional prioritization list and a non-functional prioritization list for the predetermined number of the one or more open source candidates, wherein the functional prioritized list ranks the predetermined number of the one or more open source candidates based on the functional fitness scores and the non-functional prioritized list ranks the predetermined number of the one or more open source candidates based on the non-functional functional fitness scores. Embodiments of the computer program product, the computer-readable medium further includes a ninth set of codes for causing a computer to determine a consolidated prioritized list based on both the functional prioritized list and the non-functional prioritized list.

Thus, systems, apparatus, methods, and computer program products herein described in detail below describe validating and prioritizing open source software libraries through use of evolutionary learning techniques. Data associated with the open source software candidates is collected into a cluster and, at an eligibility layer, a fitness score is determined for each of the open source software candidate. Candidates that are determined to meet a required fitness score threshold are passed to the crossover layer, at which, software and hardware standards rules are applied to the open source software metadata to validate the open source software. Invalid candidates are held in queue and subjected to rework analysis. A mutation layer executes the crossover layer iteratively until a predetermined volume of open source candidates results. A ranking layer provides a prioritized ranking list, based on the fitness score, of those open source software candidates that have validated. The list is displayed with a dashboard application to applicable software developers.

BRIEF DESCRIPTION OF THE DRAWINGS

Figure 1:
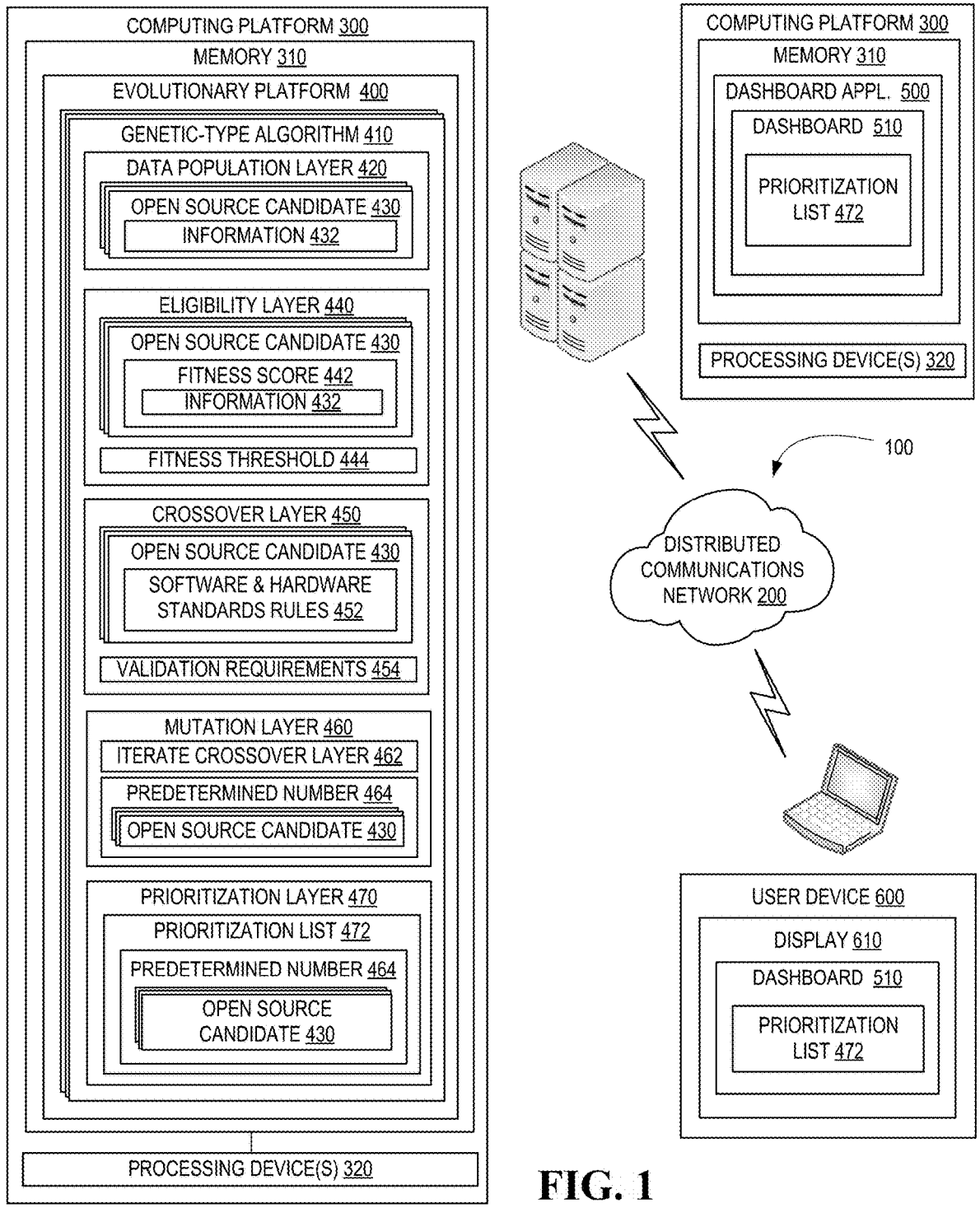
Figure 2:
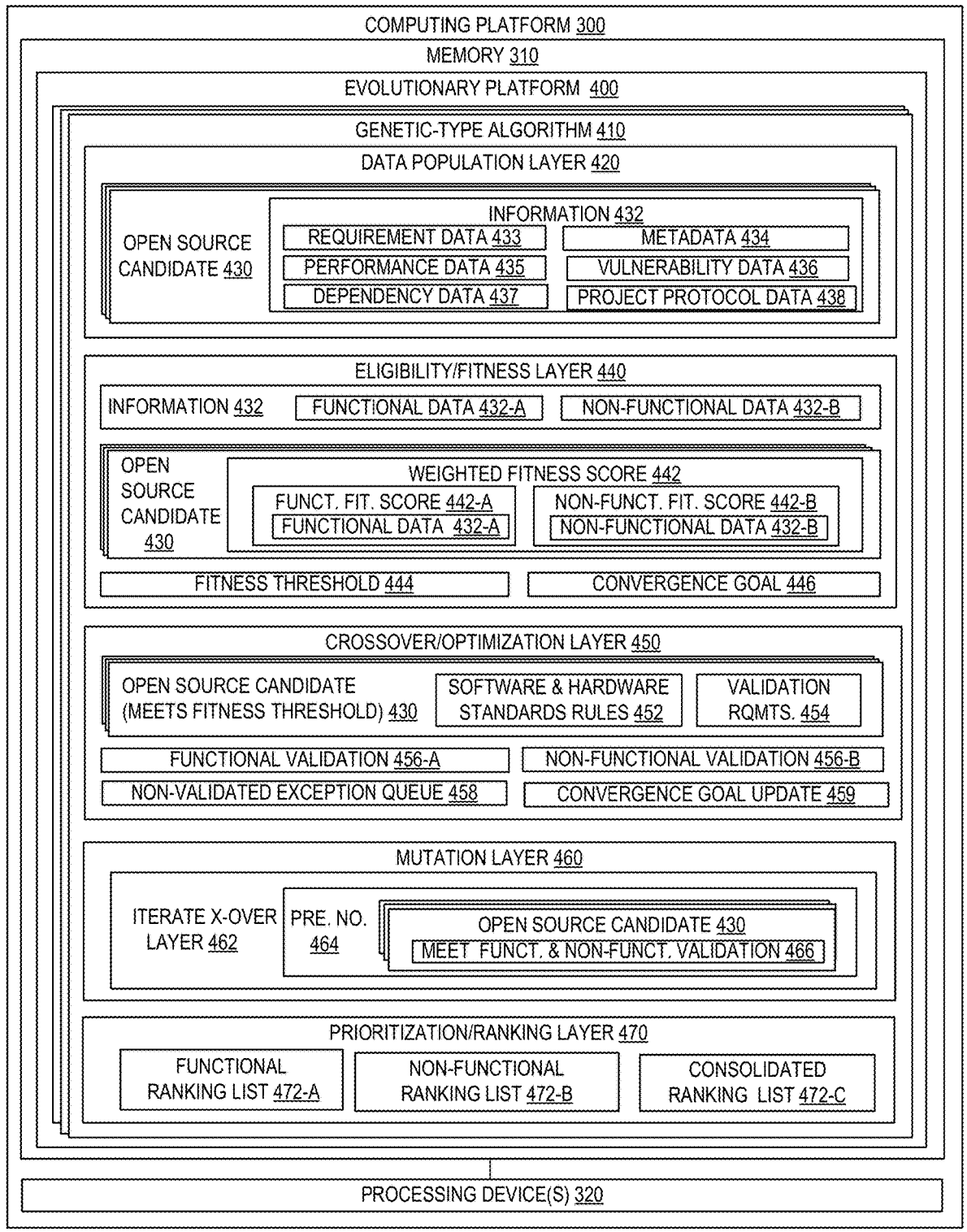
Figure 3:
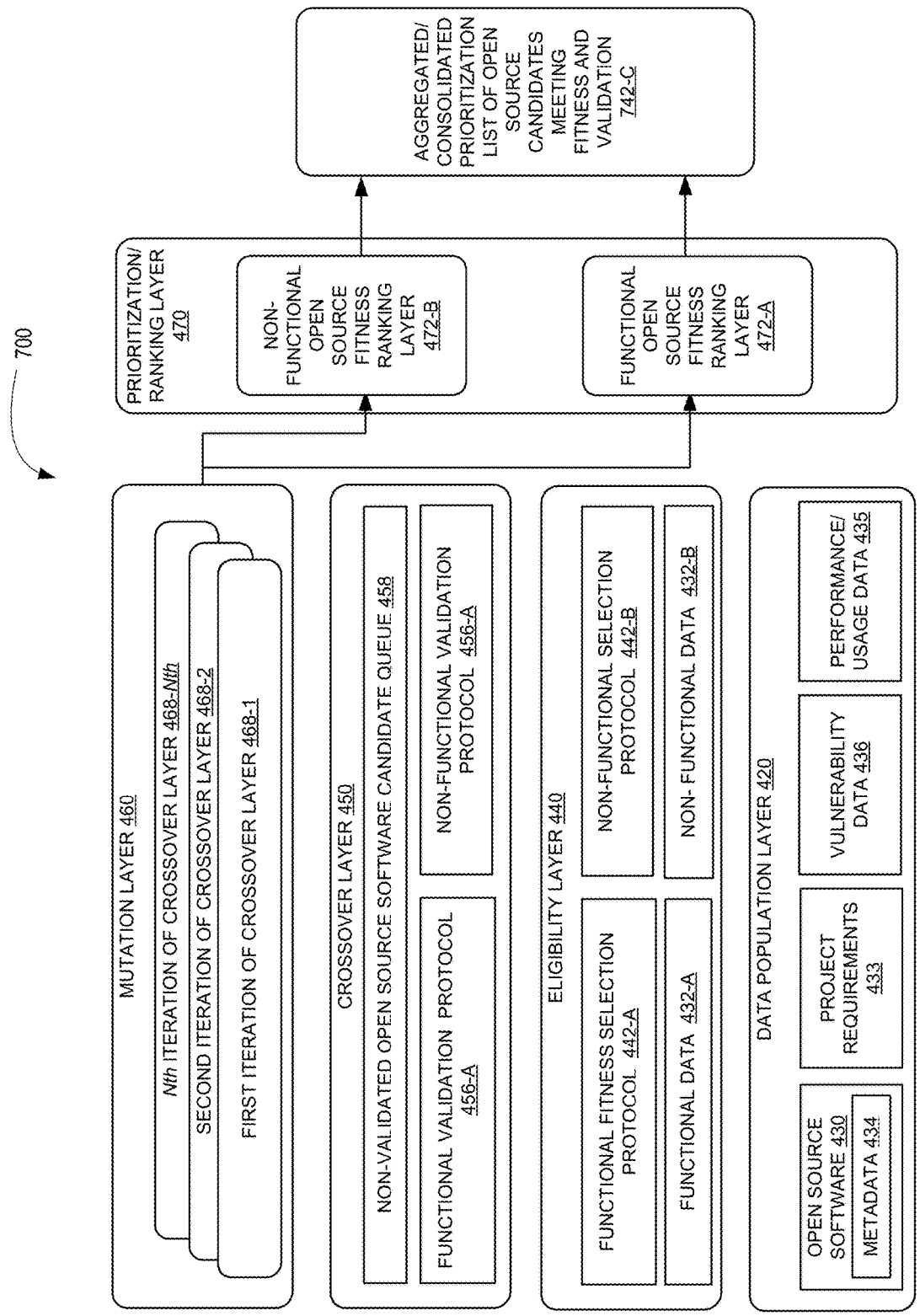
Figure 4:
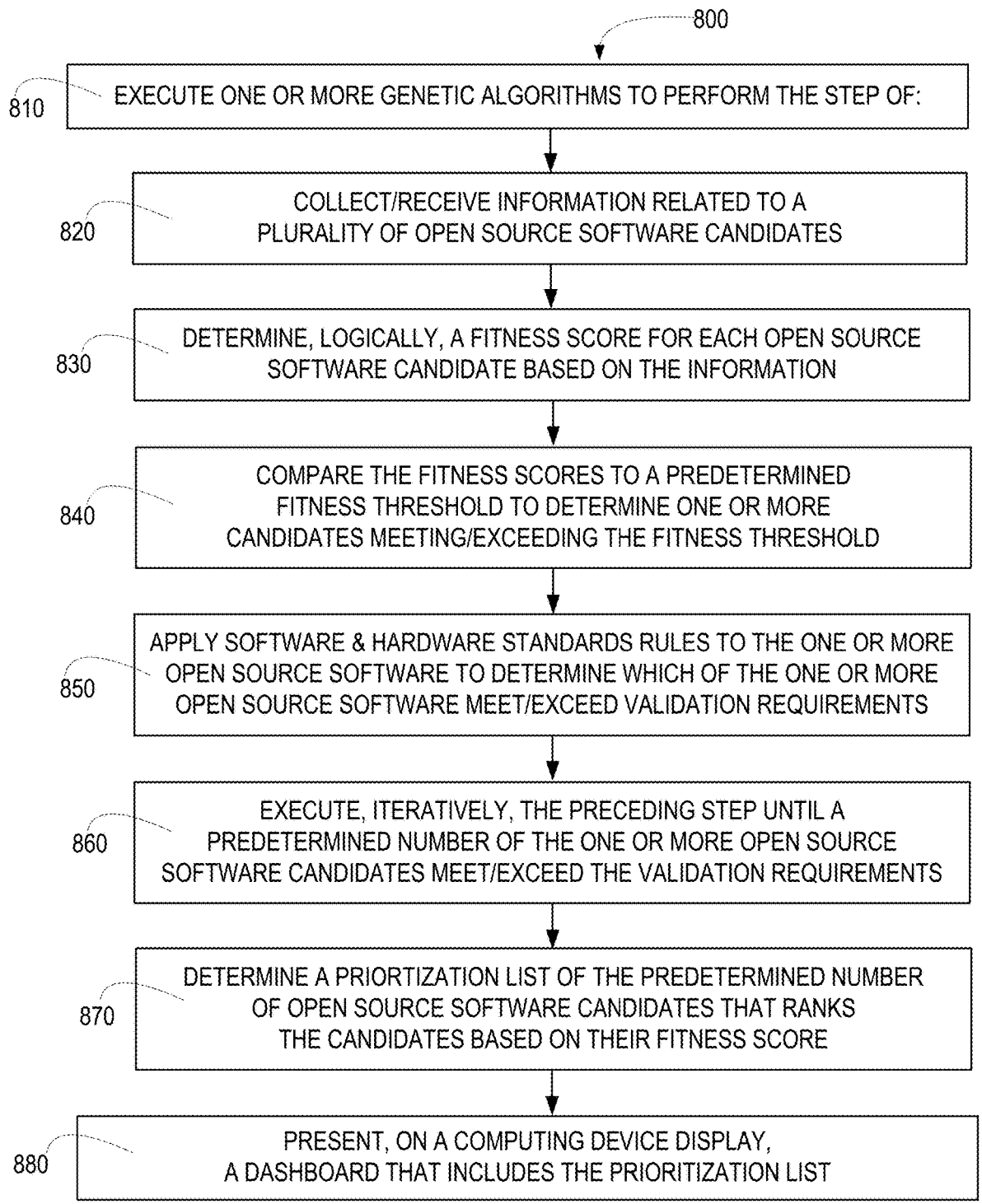

Having thus described embodiments of the invention in general terms, reference will now be made the accompanying drawings, wherein:

FIG. 1 is a schematic/block diagram of a system for prioritizing and validating open source software using an evolutionary/genetic platform, in accordance with embodiments of the present invention;

FIG. 2 is a detailed block diagram of a computing platform for prioritizing and validating open source software using an evolutionary/genetic platform, in accordance with embodiments of the present invention;

FIG. 3 is a schematic diagram of an evolutionary platform for prioritizing and validating open source software, in accordance with embodiments of the present invention; and FIG. 4 is a method for prioritizing and validating open source software using an evolutionary/genetic platform, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as PYTHON, JAVA, PERL, SMALLTALK, C++, SPARK SQL, HADOOP HIVE or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" or "configured for" perform (or "configured for" performing) a certain function in a variety of ways, including, for example, by having one or more general-purpose circuits perform the function by executing particular computer-executable program code embodied in computer-readable medium, and/or by having one or more application-specific circuits perform the function.

Thus, as described in more detail below, embodiments of the present invention utilize evolutionary learning techniques to identify and prioritize suitable open source software candidates that meet both project level and enterprise level requirements and have the requisite functional fitness in terms of vulnerabilities, defects, hardware and software dependencies, usage familiarity, performance and the like. Specifically, genetic-type algorithms executed within an evolutionary computing platform are implemented to intelligently analyze various open source candidates and generate a ranked/prioritized listing of suitable open source software candidates that is subsequently presented to a user via a dashboard-type application.

The algorithms are configured to receive and/or collect a population of data, referred to herein as a cluster, for each of the open source software candidates, otherwise referred to as an open source library. This data may include, but is not limited to, the metadata associated with the open source code; security vulnerability data including defects, data leakage issues and the like; project and enterprise requirements data, usage and performance data, hardware and software dependency data, hardware and software standards rules and the like.

Once the clusters are formed, the eligibility layer determines a fitness score for each of the open source software candidates based on the data in their respective cluster. In specific embodiments of the invention, the eligibility layer bifurcates the data in the cluster into two separate categories, a functional data category and a non-functional data category and determines a separate fitness score for both the functional data and the non-functional data. The fitness scores are compared to a threshold to identify which open source software candidates are eligible for the crossover layer. In addition, the eligibility layer defines a convergence goal as the number of open source software candidates that meet or exceed the fitness threshold.

The crossover layer applies software and hardware standards rules to the metadata of the eligible open source software candidates to determine which candidates are validated. In specific embodiments of the invention, the crossover layer applies the software and hardware standards rules to the functional and non-functional metadata of the eligible open source software candidates to determine functional validation and non-functional validation. Eligible open source software candidates determined to be invalid are placed in a rework queue where issues related to their invalidation may be addressed. A mutation layer iteratively executes the crossover layer until a predetermined number of eligible candidates are determined to meet validation requirements. A prioritization/ranking layer determines a ranked listing of the eligible and validated open source software candidates, in which the ranking is based on the fitness score. In specific embodiments, the prioritization/ ranking layer determines both functional ranked listing and a non-functional ranked listed and aggregates/consolidated the two ranked listed into one overall prioritization/ranked list of eligible and validated open source software candidates. Subsequently, the ranked listing(s) are displayed within a dashboard-type application, so that developers can choose the best open source software for the specified technical project.

Turning now to the figures, FIG. 1 illustrates a system 100 for validating and prioritizing open source software, in accordance with embodiments of the invention. The system 100 is implemented in a distributed communication network 200, which may include the Internet, one or more intranets, one or more cellular networks or the like. The system 100 includes a computing platform 300, which may comprise one or more application servers or the like. The computing platform 300 includes a memory 310 and one or more processing devices 320 in communication with a memory 310.

The memory 310 of computing platform 300 stores evolutionary platform 400 that includes one or more genetic-type algorithms 410, which are executable by the processing devices 320 and configured to validate and prioritize open source software candidates 430 for a specified technical project. The genetic-type algorithms 410 includes data population layer 420 that is configured gather information 432 associated with each of the plurality of open source candidates 430. Gathering of information 432 may include collecting information 432 from various information sources or receiving information 432 from various information sources on demand or on a predetermined schedule. The information 432 forms the basis for the genetic-type algorithms to subsequently determine the eligibility/fitness of the open source candidate from a technical project perspective, as well as, the validation of the open source candidate from an overall enterprise perspective. The information 432 may include, but is not limited to, metadata associated with the open source candidates, usage/performance data for open sources candidates currently in use throughout the enterprise, known vulnerabilities, including possible data leakage, and/or defects associated with an open source candidate, hardware and software dependencies associated with an open source candidate, standards/rules associated with the use of open source software, project requirements and the like.

The genetic-type algorithms 410 also include eligibility layer 440 that is configured to determine which of the open source candidates 430 all eligible to be further considered for subsequent prioritization and how they eligible open source candidates should be ranked/prioritized. In this regard, the eligibility layer 440 is configured to determine a fitness score 442 for each of the open source candidates 430 based on at least a portion of the information 432 gathered in the data population layer 420. The fitness score 442 takes into account the technical project-level expectations, as well as the familiarity/performance, known hardware and software dependencies, vulnerabilities/defects and the like to determine the fitness score. In specific embodiment of the system, the eligibility layer 440 identifies the mapping between technical project requirements and the metadata of the open source candidate to result in fitness score 442. In other specific embodiments of the system, the fitness score 442 is a weighted score that sums a positive value associated with attributes of the open source candidate 430 (e.g., good performance/familiarity, minimal dependencies, minimal/no vulnerabilities/defects and the like) and a negative value associated with other attributes of the open source candidate (e.g., suspect performance, minimal/no familiarity, performance issues, known defects, possibility for data leakage and the like). Once the fitness score 442 is determined for each of the open source software candidates it is compared to a predetermined fitness threshold 444 to determine which of the open source software candidates 430 are eligible for further consideration for prioritization (i.e., processing by the crossover layer).

Additionally, the genetic-type algorithms 410 include a crossover layer 450 that is configured to determine whether eligible open source software candidates (i.e., candidates that meet the requisite fitness threshold 444) can be validated in terms of meeting requisite validation requirements 454. In this regard, the crossover layer 450 is configured to determine whether eligible open source software candidates fulfill enterprise-level expectations. Specifically, the crossover layer 450 is configured to apply enterprise-level software and hardware standards/rules 452 to the open source software to determine if the eligible open source software candidates can be validated. If eligible open source candidates do not meet validation requirements 454, they are moved to an exception queue where the invalid candidates undergo problem resolution in an attempt to address issues that resulted in the invalid status. If eligible candidates do meet validation requirements 454, they are moved to the prioritization layer for subsequent ranking of eligible open source candidates 430.

In addition, genetic-type algorithms 410 include a mutation layer 460 that is configured to ensure that a predetermined number 464 of eligible open source candidates are prioritized/ranked. In this regard, the mutation layer 460 is configured to iterate 462 the exception queue of the crossover layer 450 until the predetermined number 464 of eligible open source software candidates 430 results. As previously discussed, candidates that are determined to be invalid within the crossover layer 450 are placed in an exception queue and those candidates undergo, over time, problem resolution in order to address the problems which caused the invalidation. Each iteration 462 of the crossover layer 450 will occur at prescribed intervals (e.g., days, a week or the like) to ensure that one or more of the candidates in the exception queue have undergone problem resolution.

Moreover, genetics-type algorithms 410 include prioritization layer 470 that is configured to provide a prioritization/ranked list 472 of the predetermined number 464 of open source candidates based on the fitness scores 442 of the eligible open source software candidates 430.

The computing platform 300 additionally includes a dashboard application 500 that is stored in the memory 310, executable by the processing device(s) 310 and configured to present, on a display 610 of a user device 600, a dashboard 510 that includes the prioritization list 472. In this regard, the user accesses the dashboard 610 to view the prioritization listing 472 to make informed decisions on which open source software candidate is best suited for a particular technical project.

Referring to FIG. 2, a block diagram is depicted of a computing platform 300 configured for prioritizing and validating open source software candidates through implementation of evolutionary learning techniques, in accordance with various alternate embodiments of the invention. Computing platform 300, which may comprise one or more computing devices (e.g., application server(s) or the like), is configured to execute software programs, including instructions, algorithms, modules, routines, applications, tools and the like. Computing platform 300 includes memory 310 and the like which may comprise volatile and non-volatile memory, such as read-only and/or random-access memory (RAM and ROM), EPROM, EEPROM, flash cards, or any memory common to computing platforms). Moreover, memory 310 and the like may comprise cloud storage, such as provided by a cloud storage service and/or a cloud connection service.

Further, computing platform 300 also includes at least one processing device 320, which may be an application-specific integrated circuit ("ASIC"), or other chipset, logic circuit, or other data processing device configured to execute the evolutionary platform 400 including the genetic-type algorithms(s) 410. Processing device(s) 320 or the like may execute one or more application programming interface (APIs) (not shown in FIG. 2) that interface with any resident programs, such as evolutionary platform 400 including the genetic-type algorithms(s) 410 or the like stored in the memory 310 of the computing platform 300 and any external programs. Processing device(s) 320 may include various processing subsystems (not shown in FIG. 2) embodied in hardware, firmware, software, and combinations thereof, that enable the functionality of computing platform 300 and the operability of computing platform 300 on distributed communications network 200. For example, processing subsystems allow for initiating and maintaining communications and exchanging data with other networked devices, such as user device 600. For the disclosed aspects, processing subsystems of computing platform 300 may include any processing subsystem used in conjunction with evolutionary platform 400 including the genetic-type algorithms(s) 410 and related engines, tools, routines, sub-routines, algorithms, sub-algorithms, sub-modules thereof.

Computing platform 300 may additionally include a communications module (not shown in FIG. 2) embodied in hardware, firmware, software, and combinations thereof, that enables electronic communications between computing platform 300 and other network devices, such as, but not limited to, user device 600. Thus, communication module may include the requisite hardware, firmware, software and/or combinations thereof for establishing and maintaining a network communication connection with one or more network devices.

Memory 310 stores evolutionary platform 400 including the genetic-type algorithms(s) 410 which, as described in relation to FIG. 1, is configured to prioritize and validate open source software for purpose of considering use thereof in a specified technical project.

The genetic-type algorithms 410 includes a data population layer 420 that is configured gather information 432 associated with each of the plurality of open source candidates 430. Gathering of information 432, as used herein, may include collecting information 432 from various information sources or receiving information 432 from various information sources on demand, as needed or on a predetermined schedule. As previously discussed, the information 432 forms the basis for the genetic-type algorithms to subsequently determine the eligibility/fitness of the open source candidate from a technical project perspective, as well as, the validation of the open source candidate from an overall enterprise perspective. The information 432 may include, but is not limited to, requirements data 433, such as standards/rules applicable to the use of open source software, metadata 434 associated with the open source candidates 430, usage/performance 435 data for open sources candidates 430 currently in use throughout the enterprise, known vulnerability data 436, including possible data leakage, and/or defects associated with an open source candidate 430, hardware and software dependency data 437 associated with an open source candidate 430, project requirement/protocol data 438 and any other data that is pertinent to determining the project-level and/or enterprise-level expectancies of the open source software candidates 430.

The genetic-type algorithms 410 also include eligibility layer 440, also referred to as fitness layer or candidate selection layer that is configured to determine which of the open source candidates 430 all eligible to be further considered for subsequent prioritization and how they eligible open source candidates should be ranked/prioritized. In specific embodiments of the invention, the eligibility layer 440 or in some embodiments the data population layer 420 is configured to bifurcate/split the information 432 into two separate categories, specifically functional data category 432-A and non-functional data category 432-B. Functional data 432-A may include data that defines the functional expectations of the technical project, including, but not limited to, requirements data 433, usage/performance data 435. Non-functional data 432-B may include data that defines non-functional expectations of the technical project including, but not limited to, vulnerabilities data 436, including any defects or data leakage issues, dependency data 438 (e.g., dependent on specific operating systems or the like).

As previously discussed, the eligibility layer 440 is configured to determine a fitness score 442 for each of the open source candidates 430 based on at least a portion of the information 432 gathered in the data population layer 420. In specific embodiments of the invention the fitness score determination includes using project protocol/requirement data 438 to perform stress testing and performance benchmarking to determine if the open source software candidates are capable of handling large volumes of data, levels of latency experiences by the software, memory leakage and the like. Additionally, vulnerabilities associated with a specific open source software candidate may identified from the vulnerability data (i.e., a mapping of defects to vulnerabilities) and through execution of vulnerability detection routines, such as static code scans, security testing and the like. Vulnerabilities, as used herein, include any intentional or unintentional issue present in the open source software code which result in incidents, such as data leakage, virus attacks, structured query language (SQL) injections, trojan/malware attacks or the like.

In specific embodiments of the system, the fitness score 442 is a weighted score that sums a positive values/scores and negative values/scores for each fitness attribute/dimension. For example, in specific embodiments of the invention. The fitness attributes/dimensions include, performance, project requirements, project rules/standards, vulnerabilities and existing defects. Performance identifies previous usage/familiarity of the open source software and indicators as to the performance of the open source software in those use cases. Project requirements identify, through code scans or the like, whether the open source software/code is suitable for project requirement. If the project requirements are completely fulfilled a positive value/score is assigned and if project requirements are only partially fulfilled both a negative value/score or a positive/value score and negative value/score are assigned. Project rules/standards identifies whether the open source software leverages the correct version of the programming stack as per expectations. If the open source software is determined to not meet expectations a negative value/score is assigned. In terms of vulnerabilities, if the open source software contains any vulnerabilities a negative value/score is assigned with the magnitude of the negative value/score being based on the foreseen impact of the vulnerabilities. In terms of defects, if the open source software exhibits any defects, a negative values/score is assigned with the magnitude of the negative value/score being based on the relevance with applicable project requirements.

In those embodiments in which the information 442 is bifurcated into functional data 432-A and non-functional data 432-B, the eligibility layer 440, is configured to determine a functional fitness score 442-A based on the functional data 432-A and a non-functional fitness score 442-A based on the non-functional data 432-B.

Once the fitness score 442 is determined for each of the open source software candidates, the fitness score 442 is compared to a predetermined fitness threshold 444 to determine which of the open source software candidates 430 are eligible for further consideration for prioritization (i.e., processing by the crossover layer). In those embodiments of the invention in which the eligibility layer 440 determines a functional fitness score 442-A and a non-functional fitness score 442-B, the fitness scores 442-A, 442-B are compared to a respective functional fitness threshold and non-functional fitness threshold. In such embodiments of the invention, both the functional fitness score 442-A and the non-functional fitness score 442-B are required to meet/exceed their respective thresholds in order for open source candidate to be eligible for prioritization (i.e., further processing by the crossover layer). Open source software candidates that are determined not to meet fitness threshold(s) are placed in a fitness exception queue (not shown in FIG. 2). Manual intervention and requisite approval may be required to remove a candidate from the fitness exception queue (i.e., further processing by the crossover queue).

In addition, the number of open source software candidates that meet or exceed the fitness threshold define a convergence goal. The convergence goal 446 is subsequently used at the mutation layer 460 to determine the number of iterations 462 required of the crossover layer 450.

Additionally, the genetic-type algorithms 410 include a crossover layer 450, otherwise referred to as an optimization layer, that is configured to determine whether eligible open source software candidates (i.e., candidates that meet the requisite fitness threshold 444) can be validated in terms of meeting requisite validation requirements 454. Specifically, the crossover layer 450 is configured to apply enterprise-level software and hardware standards/rules 452 to the open source software to determine if the eligible open source software candidates can be validated. The crossover layer provides enterprise-wide validation/approval of the eligible open source software candidates based on proper coding standards, technical combinations, infrastructure requirements, potential issues and external approvals for upstream and/or downstream expectations. In those embodiments of the invention, in which the information 432 is bifurcated into functional data 432-A and non-functional data 432-B, the crossover layer 450 is configured functional validation 456-A and non-functional validation 456-B (i.e., whether the open source software candidate meets functional requirements at the enterprise-level and whether the open source software candidate meets non-functional requirements at the enterprise-level).

If eligible open source candidates do not meet validation requirements 454, the invalid open source candidates are moved to a non-validated exception queue 458 where the invalid candidates undergo problem resolution process in an attempt to address issues that resulted in the invalid status. In those embodiments of the invention in which the crossover layer 450 is configured to determine functional validation 456-A and non-functional validation 456-B, separate non-validated exception queues 458 may exist for open source candidates that do meet function validation requirements and non-functional validation requirements. Non-validated open source software candidates placed in the exception queue 458 will, over time, undergo problem resolution processing in an attempt to address the problems that resulted in the software being determined to be invalid (i.e., not meet functional and/or non-functional enterprise-level requirements).

If eligible candidates are determined to meet validation requirements 454, they are moved to the prioritization layer 470 for subsequent ranking of eligible open source candidates 430. In those embodiments of the invention in which the crossover layer 450 is configured to determine functional validation 456-A and non-functional validation 456-B, an open source software candidate 440 is required to meet both functional and non-functional validation requirements in order for the open source candidate to moved to the prioritization layer 470.

In addition, once the crossover later has completed execution, the convergence goal 446 is updated to reflect the number of open source candidates 430 that have been validated.

Additionally, genetic-type algorithms 410 include a mutation layer 460 that is configured to ensure that a predetermined number 464 of eligible open source candidates meet 466 validation, such as functional 456-A and non-functional 456-B validation. In other word, ensure that a predetermined number of eligible open source candidates are subsequently prioritized/ranked by the prioritization layer 470 for technical project consideration. In this regard, the mutation layer 460 is configured to iterate 462 the exception queue of the crossover layer 450 until the predetermined number 464 of eligible open source software candidates 430 results. As previously discussed, the convergence goal may be used to determine the number of iterations 462 of the crossover layer 450. Each iteration 462 of the crossover layer 450 will occur at prescribed intervals (e.g., days, a week or the like) to ensure that one or more of the candidates in the exception queue have undergone an attempt at problem resolution.

Moreover, genetics-type algorithms 410 include prioritization layer 470 that is configured to provide a prioritization/ranked list 472 of the predetermined number 464 of open source candidates based on the fitness scores 442 of the eligible open source software candidates 430. In those embodiments of the invention, in which the eligibility layer 440 is configured to determine both a functional fitness score 442-A and a non-functional fitness score 442-B, the prioritization layer may be configured to determine both a functional prioritization/ranking list 472-A and a non-functional prioritization/ranking list 472-B. In such embodiments of the invention, the prioritization layer 470 may be further configured to consolidate the functional prioritization/ranking list 472-A and a non-functional prioritization/ranking list 472-B into one composite/consolidated prioritization/ranking list 472-C that reflects both functional and non-functional expectations of the technical project.

Referring to FIG. 3, a schematic diagram is presented of a system 700 for prioritizing and validating open source software using evolutionary learning techniques, in accordance with embodiments of the present invention. The evolutionary platform includes a data population layer 420 that is configured to gather (i.e., collect or receive) information pertaining to a plurality of open source software candidates. The information includes, but is not necessarily limited to, metadata 434 associated with the open source software candidates 430; project requirements 433, including standards/rules applicable to the project; vulnerability data 436 including defects and data leakage; and performance/usage data, including familiarity data and the like.

The evolutionary platform additionally includes an eligibility layer 440 that receives the information from the data population layer and, in certain embodiments bifurcates/splits the information into functional data 432-A and non-functional data 432-B. Functional data may include data that defines the functional expectations of the technical project, including, but not limited to, requirements data, usage/performance data. Non-functional data may include data that defines non-functional expectations of the technical project including, but not limited to, vulnerabilities data, including any defects or data leakage issues, software and/or hardware dependency data and the like. The eligibility layer 440 includes functional fitness selection protocol 442-A that is configured to determine which of the open source software candidates are eligible for further consideration/processing based on the functional data 432-A and non-functional selection protocol 442-B that is configured to determine which of the open source software candidates are eligible for further consideration/processing based on the non-functional data 432-b. In specific embodiments of the invention, the protocols 442-A and 442-B are configured to determine functional and non-functional fitness scores and compare the scores to thresholds to determine which of the open source software candidates 430 are eligible for further consideration/processing.

The evolutionary platform additionally includes a crossover layer 450 that is configured to determine whether eligible open source software candidates (i.e., candidates found to meet project-level expectations at the eligibility layer 440) meet validation requirements. In specific embodiments of the system, the crossover layer 450 includes functional validation protocol 456-A and non-functional validation protocol 456-B configured to apply enterprise-level functional and non-functional standards/rules to the eligible open source software candidates to determine whether the candidates meet/exceed functional and non-functional validation requirements. Additionally, the crossover layer 450 includes a non-validated queue 458 that stores eligible open source software candidates that are determined to be invalid.

The mutation layer 460 is configured to conduct an nth number of iterations of the crossover layer in order to determine a predetermined number of eligible open source software candidates that are valid (i.e., meet validation requirements). As previously discussed, the exception queue 458 will undergo continual problem resolution processing in an attempt to resolve issues that resulted in invalidation. Thus, each iteration of the crossover layer 450 may result in additional eligible open source software candidates that meet validation requirements. In the illustrated embodiment of FIG. 3, first 468-1, second 468-2 and Nth iteration of the crossover over layer are performed to result in the requisite predetermined number of validated and eligible open source software candidates.

Additionally, the evolutionary platform includes a prioritization/ranking layer 470 that includes a non-functional ranking layer 472-B configured to determine a non-functional prioritization/ranking listing of eligible and validated open source software candidates based on the non-functional fitness scores and a functional ranking layer 472-A configured to determine a functional prioritization/ranking listing of eligible and validated open source software candidates based on the functional fitness scores. Additionally, the prioritization layer 470 is configured to aggregate/consolidate the functional and non-functional lists into a consolidated listing 7472-C.

Referring to FIG. 4 a flow diagram is presented of a methodology 800 for prioritizing and validating open source software through use an evolutionary learning techniques, in accordance with embodiments of the present invention. At Event 810, one or more genetic-type algorithms with an evolutionary computing platform are executed to perform the Events 820-870. At Event 820, information related to a plurality of open source software candidates is collected and/or received. As previously discussed, the information may be any information that provides the expectations of the specific project to which the open source software/code will be applied as well as enterprise-wide expectations. The information may include, but is not limited to, metadata associated with the open source candidates; usage/performance data for open sources candidates currently in use throughout the enterprise; known vulnerability data, including possible data leakage, and/or defects associated with an open source candidate; hardware and software dependency data associated with an open source candidate, and requirements data, including standards and rules applicable to open source software.

At Event 830, a fitness core is logically determined for each open source software candidate based on the information previously collected/received. In specific embodiments of the method, in which the information has been previously bifurcated/separated into functional data and non-functional data, separate functional and non-functional fitness scores may be determined. In other specific embodiments of the invention the fitness score is a weighted score that applies positive values for attributes meeting expectations and negative values for attributes failing to meet expectations.

At Event 840, the fitness scores are compared to a predetermined fitness threshold to determine one or more candidates that meet or exceed the fitness threshold. (i.e., eligible open source fitness candidates). In those embodiments of the invention in which separate functional and non-functional fitness scores are determined, each respective fitness score is compared to a corresponding functional or non-functional fitness threshold and both are required to meet/exceed their corresponding threshold to determine an eligible candidate.

At Event 850, software and hardware standards/rules are applied to the eligible open source software candidates to determine which of the eligible open source software candidates meet or exceed validation requirements. In specific embodiments of the method. In which the information has been previously bifurcated/separated into functional data and non-functional data, validation may occur at both the functional level and the non-functional level. Open source candidates that are determined to not meet validation requirements (i.e., invalid open source software candidates) are placed in an exception queue and subject to subsequent problem resolution.

At Event 860, preceding Event 850 is iteratively executed until a predetermined number of eligible open source software candidates are determined to meet/exceed the validation requirements. In specific embodiments of the method, preceding Event 850 is iteratively executed until a predetermined number of eligible open source software candidates are determined to meet/exceed both the functional and non-functional validation requirements.

At Event 870, a prioritization list of the predetermined number of eligible open source software candidates is determined that ranks the eligible open source software candidates based on their fitness scores. In those embodiments of the method in which separate functional and non-functional fitness scores are determined, separate functional and non-functional prioritization lists may be determined and subsequently consolidated into one comprehensive prioritization list that reflects both functional and non-functional expectations.

At Event 880, a dashboard is presented on a user device that includes presentation of the prioritization list, such that, a user can consider the ranked listing of eligible open source candidates for use in the specified project. In specific embodiments of the method, the dashboard may provide presentation of both the functional prioritization list, the non-functional prioritization list, as well as, the consolidated prioritization list.

As evident from the preceding description, the systems, methods and the like described herein represents an improvement in technology, specifically, embodiments of the present invention provide for validating and prioritizing open source software libraries through use of evolutionary learning techniques. Data associated with the open source software candidates is collected into a cluster and, at an eligibility layer, a fitness score is determined for each of the open source software candidate. Candidates that are determined to meet a required fitness score threshold are passed to the crossover layer, at which, software and hardware standards rules are applied to the open source software metadata to validate the open source software. Invalid candidates are held in queue and subjected to rework analysis. A mutation layer executes the crossover layer iteratively until a predetermined volume of open source candidates results. A ranking layer provides a prioritized ranking list, based on the fitness score, of those open source software candidates that have validated. The list is displayed with a dashboard application to applicable software developers.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for validating and prioritizing open-source software, the system comprising:
   a computing platform including a memory, and one or more processing devices stored in the memory;
   an evolutionary computing platform stored in the memory, executable by the one or more processing devices and including one or more genetic-type algorithms including:
      a data population layer configured to gather information related to a plurality of open source software candidates to be considered for use in a technical project;
      an eligibility layer configured to (i) logically determine a fitness score for each of the plurality of open sources software candidates based on the information, and (ii) compare the fitness score to a predetermined fitness threshold to determine one or more open source software candidates that meet or exceed the predetermined fitness threshold;
      a crossover layer configured to (i) receive the one or more open source software candidates determined to meet or exceed the predetermined fitness threshold, (ii) apply software standards rules and hardware standards rules to the one or more open source software candidates to provide validation results, and (iii) compare the validation results to a predetermined validation threshold to determine which of the one or more open source software candidates meet or exceed the predetermined validation threshold;
      a mutation layer configured to iteratively execute the crossover layer until a predetermined number of the one or more open source software candidates meet or exceed the predetermined validation threshold; and
      a prioritization layer configured to (i) receive the predetermined number of the one or more open source software candidates, and (ii) determine a prioritization list of the predetermined number of the one or more open source candidates, wherein the prioritized list ranks the predetermined number of the one or more open source candidates based on the fitness score; and
   a dashboard application stored in the memory, executable by the one or more processing devices and configured to present on a computing device display the prioritized list.

2. The system of claim 1, wherein the data population layer is further configured to gather information related to a plurality of open source software candidates, wherein the information includes one or more of (i) metadata associated with an open source software candidate, (ii) requirement data associated with open source software, (iii) performance data associated with one or more of the open source software candidates, (iv) data leakage and vulnerability data associated with the open source software candidates, and (v) dependency data associated with hardware and software dependencies of the open source software candidates.

3. The system of claim 1, wherein the eligibility layer is further configured to bifurcate the information related to the plurality of open source software candidates into (a) a functional information, and (b) a non-functional information, and (i) logically determine a functional fitness score based on the functional information and a non-functional fitness score based on the non-functional fitness score, and (ii) compare the functional fitness score to a predetermined functional fitness threshold and the non-functional fitness score to a predetermined non-functional fitness threshold to determine one or more open source software candidates that meet or exceed both the predetermined functional fitness threshold and the predetermined non-functional fitness threshold.

4. The system of claim 3, wherein the eligibility layer is further configured to bifurcate the information related to the plurality of open source software candidates into (a) the functional information, and (b) the non-functional information, wherein the functional information includes one or more of (i) requirements data associated with open source software, and (ii) familiarity and usage data associated with the one or more of the open source software candidates and non-functional information includes one or more of (i) security vulnerability data including data leakage data associated with one or more of the open source software candidates, (ii) existing defect data associated with the one or more open source software candidates, and (iii) dependency data associated with hardware and software dependencies of the open source software candidates.

5. The system of claim 3, wherein the crossover layer is further configured to (i) receive the one or more open source software candidates determined to meet or exceed both the predetermined functional fitness threshold and the predetermined non-functional fitness threshold, (ii) apply software standards rules and hardware standards rules to the functional information and the non-functional information of the one or more open source software candidates to provide functional validation results and non-functional validation results, and (iii) compare the functional validation results to a predetermined functional validation threshold and the non-functional validation results to a predetermined non-functional validation threshold to determine which of the one or more open source software candidates meet or exceed both the predetermined functional validation threshold and the predetermined non-functional validation threshold.

6. The system of claim 3, wherein the prioritization layer is further configured to (i) receive the predetermined number of the one or more open source software candidates, and (ii) determine a functional prioritization list and a non-functional prioritization list for the predetermined number of the one or more open source candidates, wherein the functional prioritized list ranks the predetermined number of the one or more open source candidates based on the functional fitness scores and the non-functional prioritized list ranks the predetermined number of the one or more open source candidates based on the non-functional functional fitness scores.

7. The system of claim 6, wherein the prioritization layer is further configured to determine a consolidated prioritized list based on both the functional prioritized list and the non-functional prioritized list and wherein the dashboard application is further configured to present on a computing device display at least one of the consolidated prioritized list, the functional prioritized list and the non-functional prioritized list.

8. The system of claim 1, wherein the eligibility layer is configured to (i) logically determine a weighted fitness score for each of the plurality of open sources software candidates based on the information, wherein the weighted fitness score is based on positive numerical values for one or more technical project level expectations being met and negative numerical values for one or more of the technical project level expectations not being met.

9. The system of claim 8, wherein the eligibility layer is configured to define a convergence goal as a number of open source software candidates that meet or exceed the fitness threshold, wherein the convergence goal is used to determine the predetermined number of the one or more open source software candidates that meet or exceed the predetermined validation threshold.

10. The system of claim 9, wherein the crossover layer is further configured to update the convergence goal based on the one or more open source software candidates that meet or exceed the predetermined validation threshold.

11. A computer-implemented method for validating and prioritizing open source software, the method executed by one or more computing processor devices and comprising:
   executing one or more genetic algorithms to perform the steps of:
      (a) gathering information related to a plurality of open source software candidates to be considered for use in a technical project;
      (b) determining, logically, a fitness score for each of the plurality of open sources software candidates based on the information;
      (c) comparing the fitness score to a predetermined fitness threshold to determine one or more open source software candidates that meet or exceed the predetermined fitness threshold;
      (d) applying software standards rules and hardware standards rules to the one or more open source software candidates to provide validation results;
      (e) comparing the validation results to a predetermined validation threshold to determine which of the one or more open source software candidates meet or exceed the predetermined validation threshold;
      (f) executing, iteratively, steps (d) and (e) until a predetermined number of the one or more open source software candidates meet or exceed the predetermined validation threshold; and
      (g) determining a prioritization list of the predetermined number of the one or more open source candidates, wherein the prioritized list ranks the predetermined number of the one or more open source candidates based on the fitness score; and
   providing on a computing device display a dashboard application that presents the prioritized list to a user.

12. The computer-implemented method of claim 11, wherein the one or more genetic algorithms perform a further step of:
   bifurcating the information related to the plurality of open source software candidates into (a) a functional information, and (b) a non-functional information, and
   wherein determining the fitness score further comprises determining a functional fitness score based on the functional information and a non-functional fitness score based on the non-functional fitness score, and comparing the fitness score further comprises comparing the functional fitness score to a predetermined functional fitness threshold and the non-functional fitness score to a predetermined non-functional fitness threshold to determine one or more open source software candidates that meet or exceed both the predetermined functional fitness threshold and the predetermined non-functional fitness threshold.

13. The computer-implemented method of claim 12, wherein (d) applying software standards rules and hardware standards rules to the one or more open source software candidates further comprises applying the software standards rules and the hardware standards rules to the functional information and the non-functional information of the one or more open source software candidates to provide functional validation results and non-functional validation results, and (e) comparing the validation results further comprises comparing the functional validation results to a predetermined functional validation threshold and the non-functional validation results to a predetermined non-functional validation threshold to determine which of the one or more open source software candidates meet or exceed both the predetermined functional validation threshold and the predetermined non-functional validation threshold.

14. The computer-implemented method of claim 12, wherein (g) determining the prioritization list further comprises determining a functional prioritization list and a non-functional prioritization list for the predetermined number of the one or more open source candidates, wherein the functional prioritized list ranks the predetermined number of the one or more open source candidates based on the functional fitness scores and the non-functional prioritized list ranks the predetermined number of the one or more open source candidates based on the non-functional functional fitness scores.

15. The computer-implemented method of claim 14, further comprising determining a consolidated prioritized list based on both the functional prioritized list and the non-functional prioritized list.

16. A computer program product including non-transitory computer-readable medium that comprises:
   a first set of genetic algorithm codes for causing a computer to collect information related to a plurality of open source software candidates to be considered for use in a technical project;
   a second set of genetic algorithm codes for causing a computer to logically determine a fitness score for each of the plurality of open sources software candidates based on the information;
   a third set of genetic algorithm codes for causing a computer to compare the fitness score to a predetermined fitness threshold to determine one or more open source software candidates that meet or exceed the predetermined fitness threshold;
   a fourth set of genetic algorithm codes for causing a computer to apply software standards rules and hardware standards rules to the one or more open source software candidates to provide validation results;
   a fifth set of genetic algorithm codes for causing a computer to compare the validation results to a predetermined validation threshold to determine which of the one or more open source software candidates meet or exceed the predetermined validation threshold;
   a sixth set of genetic algorithm codes for causing a computer to execute, iteratively, the fourth and fifth set of genetic algorithm coded until a predetermined number of the one or more open source software candidates meet or exceed the predetermined validation threshold and
   a seventh set of genetic algorithm codes for causing a computer to determine a prioritization list of the predetermined number of the one or more open source candidates, wherein the prioritized list ranks the predetermined number of the one or more open source candidates based on the fitness score; and
   an eighth set of codes for causing a computer to provide on a computing device display a dashboard application that presents the prioritized list to a user.

17. The computer program product of claim 16, wherein the computer-readable medium further comprises a ninth set of codes for causing a computer to bifurcate the information related to the plurality of open source software candidates into (a) a functional information, and (b) a non-functional information, and
   wherein the second set of codes is further configured to cause the computer to determine a functional fitness score based on the functional information and a non-functional fitness score based on the non-functional fitness score, and wherein the third set of codes is further configured to cause the computer to compare the functional fitness score to a predetermined functional fitness threshold and the non-functional fitness score to a predetermined non-functional fitness threshold to determine one or more open source software candidates that meet or exceed both the predetermined functional fitness threshold and the predetermined non-functional fitness threshold.

18. The computer program product of claim 17, wherein the fourth set of codes is further configured to cause the computer to apply the software standards rules and the hardware standards rules to the functional information and the non-functional information of the one or more open source software candidates to provide functional validation results and non-functional validation results, and wherein the fifth set of codes is further configured to cause the computer to compare the functional validation results to a predetermined functional validation threshold and the non-functional validation results to a predetermined non-functional validation threshold to determine which of the one or more open source software candidates meet or exceed both the predetermined functional validation threshold and the predetermined non-functional validation threshold.

19. The computer program product of claim 17, wherein the seventh set of codes is further configured to cause the computer to determine a functional prioritization list and a non-functional prioritization list for the predetermined number of the one or more open source candidates, wherein the functional prioritized list ranks the predetermined number of the one or more open source candidates based on the functional fitness scores and the non-functional prioritized list ranks the predetermined number of the one or more open source candidates based on the non-functional functional fitness scores.

20. The computer program product of claim 19, wherein the computer-readable medium further comprises a tenth set of codes for causing a computer to determine a consolidated prioritized list based on both the functional prioritized list and the non-functional prioritized list.

* * * * *